Patented June 3, 1930

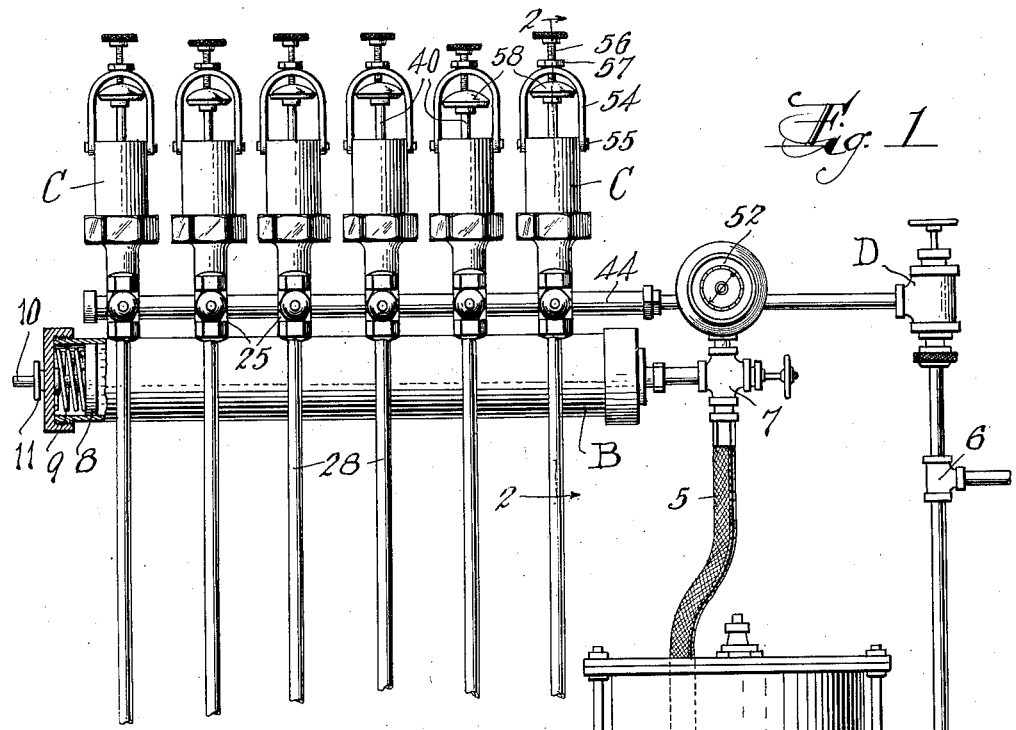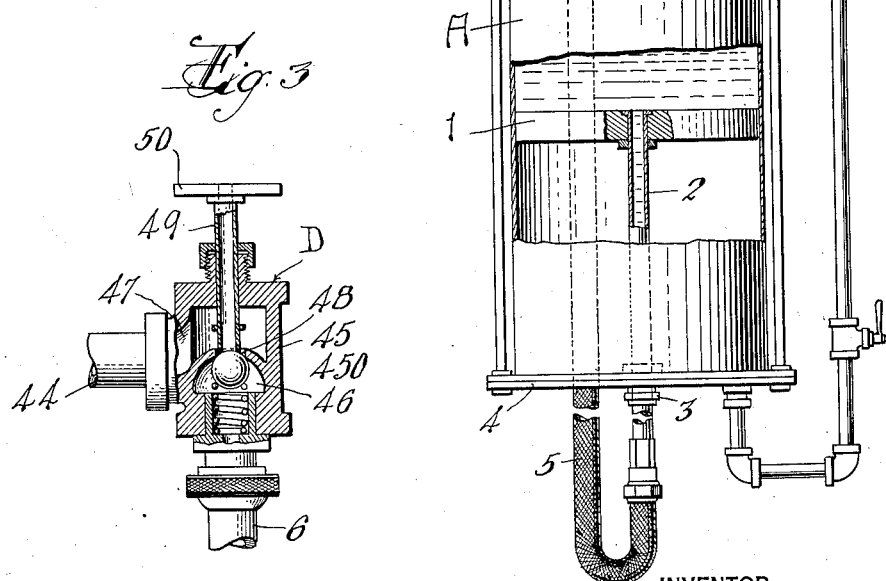

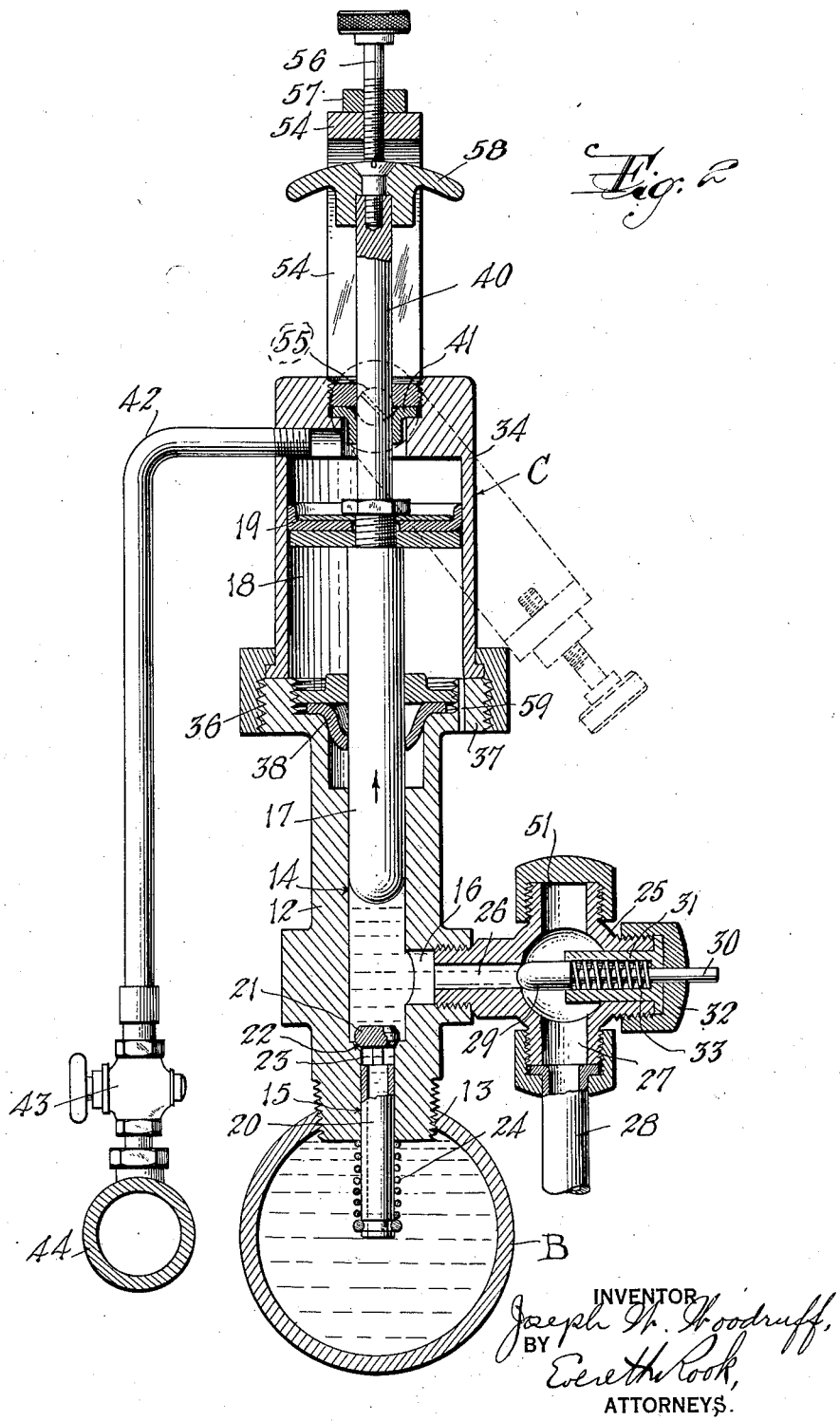

1,761,423

UNITED STATES PATENT OFFICE

JOSEPH W. WOODRUFF, OF ELIZABETH, NEW JERSEY

PRESSURE GREASE MEASURING AND DISTRIBUTING APPARATUS

Application filed May 29, 1928. Serial No. 281,389.

One object of the invention is to provide apparatus for distributing measured quantities of grease to desired points to be lubricated under high pressure.

Another object is to provide a novel and improved apparatus of this character wherein the grease is ejected from a main reservoir or container under pressure into a manifold, to which is connected a plurality of measuring pumps which independently receive the grease from said manifold and force the respective charges of grease under high pressure to the desired points of lubrication.

Other objects are to provide such apparatus wherein the measuring pumps are actuated by fluid pressure to discharge the grease therefrom and are actuated in the other direction by the grease under pressure in said manifold; to provide such measuring pumps in the form of piston and cylinder devices whereby the grease may be forced from the pumps at high pressures with relatively small fluid pressure actuating the pumps; to provide means for adjusting the measuring pumps so that different quantities of grease may be discharged therefrom at different times; to provide apparatus of the general character described which is simple and inexpensive in construction, and to obtain other advantages and results as will be brought out in the following description.

Referring to the accompanying drawings, in which corresponding and like parts are designated throughout the several views by the same reference characters, Figure 1 is a front elevation of a pressure grease measuring and distributing apparatus embodying my invention, portions being broken away and shown in section for clearness in illustration;

Figure 2 is an enlarged transverse vertical sectional view, taken on the line 2—2 of Figure 1, and Figure 3 is an enlarged sectional elevation of the fluid pressure supply controlling valve shown in Figure 1.

Specifically describing the illustrated embodiment of the invention, the reference character A designates a grease container or reservoir which is shown in the form of a cylinder in which is reciprocable a piston 1 which has a tubular piston rod 2 slidable through a packed bearing 3 in the bottom 4 of the container. The piston rod 2 is connected to a flexible hose 5 for conveying the grease from the reservoir A to a distributing manifold B. The grease is placed in the reservoir A above the piston 1, and fluid under pressure such as water or compressed air is led into the bottom 4 of the reservoir beneath the piston 1 so as to exert an upward pressure on the piston and eject the grease from the reservoir A through the hose 5 under pressure. The fluid under pressure is supplied to the reservoir from a suitable source through a pipe 6. Preferably a valve 7 is provided for controlling the flow of grease from the hose 5 into the manifold B.

The manifold B consists of a long cylinder closed at both ends into one of which leads the hose 5. At the other end of the manifold is arranged a piston 8 normally influenced toward the first-mentioned end of the manifold by a heavy compression spring 9, said piston having a rod 10 slidable through a packed bearing 11 outwardly of the manifold.

Connected to the manifold are a plurality of measuring and distributing pumps C, all of which are identical and only one of which, therefore, will be described. Each pump C comprises a casing 12 which is screw threaded at 13 into the manifold, and has a cylinder 14 provided with an inlet 15 and an outlet 16. In the cylinder 12 is reciprocable a solid piston 17 which is actuated by a fluid pressure motor including a cylinder 18 in which is reciprocable a piston 19.

The inlet 15 of the grease pump is shown as controlled by an inwardly opening check valve comprising a tube 20 slidable in the inlet passage and having a valve head 21 at the inner end thereof to seat on an inwardly facing valve seat 22, the tube being provided with lantern openings 23 beneath the valve head. The valve is influenced into closed position by a compression spring 24.

The outlet 16 is controlled by an outwardly opening check valve comprising a casing 25 having an inlet 26 connected to the pump outlet 16, and an outlet passage 27 to which is connected a distributing pipe 28 for conveying the grease to the desired point. Communication between the inlet passage 26 and the outlet passage 27 is controlled by a valve having a head 29 and a stem 30 slidably mounted in a sleeve 31 secured in the casing 25 opposite the inlet pipe 26 by a cap 32. The valve head 29 is normally influenced against its seat by a compression spring 33.

With this construction, it will be observed that the pump piston 17 will be influenced upwardly in the direction of the arrow by the pressure of the grease in the manifold B which will force the inlet valve 21 into open position. When the piston 17 is moved in the other direction by the fluid pressure motor 18, 19, the valve 21 closes and the outlet valve 25—30 is opened and permits the flow of grease through the distributing pipe 28. The pump piston 17 is of small cross-sectional area relatively to the motor piston 19, so that the grease may be ejected from the pump cylinder 14 at an extremely high pressure with a relatively low fluid pressure actuating the motor piston 19.

The fluid pressure motor includes a casing 34 open at one end in which the cylinder 18 is located, and has a union nut 35 connected to its lower end and having a screw threaded connection 36 with a flange 37 on the upper end of the pump casing 12. A packing gland 38 through which passes the pump piston 17 is arranged at the upper end of the pump casing 12 and prevents grease from being forced upwardly into the motor cylinder 18. The motor piston 19 has a piston rod 40 which is actually a continuation of the piston 17 and slides through a packed bearing 41 at the end of the motor cylinder 18 opposite the grease pump. A fluid pressure supply pipe 42 is connected at the upper end of the motor cylinder 18 to supply fluid pressure at the side of the piston 19 opposite the pump piston 17, so as to actuate the pump piston on its working stroke. Fluid pressure is supplied to the pipe 42 through a manually controlled valve 43 from a manifold fluid pressure pipe 44 to which fluid pressure is supplied from the pipe 6 through a common controlling valve D for all of the measuring pumps C.

The valve D may be of any suitable construction, but is shown as comprising a casing 45 having an inlet port 46 and an outlet port 47, communication between said ports being controlled by the inwardly closing spring-pressed ball valve 47 which controls a valve opening 48. Loosely resting upon the ball valve 47 and slidably mounted in the casing 45 opposite the inlet port 46 is an operating and vent tube 49 having a handle 50 thereon. The tube 49 normally rests upon the valve 47, as shown in Figure 3, which is normally closed. To open the valve the handle 50 is pushed downwardly, which unseats the valve and admits fluid pressure into the outlet port 47 and manifold pipe 44. The contact of the tube 49 with the ball prevents the escape of fluid through the passage and tube 49. However, when the handle 50 is released, the valve 47 closes and the back pressure in the manifold 44 and motor cylinders 18 lifts the tube 49 from the ball 47, whereby said back pressure is vented to the atmosphere through said tube.

In operation of the apparatus, the grease is constantly influenced under pressure from the reservoir A into the manifold B, from which it is influenced into the pump cylinders 14 and forces the pistons 17 to their uppermost position. Periodically, either automatically or manually, the fluid pressure is admitted to the manifold 44 by valve mechanism generally illustrated by the valve D, as by pushing downwardly upon the handle 50 of said valve, whereupon the fluid pressure is admitted into the motor cylinders 18 above the pistons 19 so that the pump pistons 17 are forced downwardly and eject the grease through the outlet pipes 28. Vent openings 59 are provided at the lower end of the motor cylinders 18 to permit air to flow into and out of the cylinders at the underside of the piston 19. When the handle 50 of the valve D is released, the fluid pressure vents through the tube 49 and the pump pistons 17 are again returned to their initial uppermost positions by the pressure in the manifold B. After the pistons 17 have reached their uppermost positions, the pressure of the grease entering the manifold B moves the piston 8 and compresses the spring 9 so as to store a certain amount of power in said spring, and at the end of the ejecting stroke of the pistons 17, this stored-up power is again imparted to the grease in the manifold B with a more or less snap action so as to cause quick return of the pistons 17 to their uppermost positions. In other words, the stored-up power in the spring 9 in part compensates for the temporary slight reduction in pressure in the manifold B which is caused by the filling of the cylinders 14 of the measuring pumps. The piston 1 in the reservoir A may move too slow to quickly fill the pump cylinders 14, and the power of the spring 9 and piston 8 serve to exert sufficient pressure on the grease in the manifold to compensate for this slow movement of the piston 1.

To adjust the grease pumps for supplying different quantities of grease, I have shown inverted U-shaped yokes 54 pivotally connected as by screws 55 to the upper ends of the motor cylinders 18 and arranged so that their bases may overlie the projecting ends of the piston rods 40. In said bases of the yokes 54 are arranged adjusting screws 56 having jam nuts 57 thereon, said screws serving as stops to be engaged by the piston rods 40 on their upward strokes. It will be understood from the foregoing that the distance of travel of the pistons 17 may be varied by adjustment of the screws 56, as shown in Figure 1 of the drawings, and thereby the quantity of grease admitted to the cylinders 14 may be varied. Also, the piston rods 40 may be provided with handles 58 for manual operation of the pumps, and when such operation is desired, the yokes 54 may be swung downwardly as indicated by dot and dash lines in Figure 2 of the drawings.

Preferably the outlet valves 25 are provided with a cap closed port 51 through which the operation of the outlet valve head 29 may be observed if there is any suspicion that the valve is not properly working. The valve stem 30 serves to show whether or not the valve is opening and closing.

A pressure gage 52 preferably is provided in the grease supply hose 5 so as to indicate the pressure in the manifold B and also to indicate when any of the inlet valves 21 are not properly operating. Should one of the valves 21 fail to completely close, on the next downward movement of the corresponding piston 17, the grease will be forced backwardly into the manifold B and slightly raise the pressure therein which will be indicated on the gage 52.

While I have shown and described my invention embodied in apparatus comprising certain details of construction, it will be understood that this is primarily for the purpose of illustrating the principles of the invention, and that many modifications and changes may be made in the details of construction without departing from the spirit or scope of the invention.

Having thus described my invention, what I claim is:

1. In a grease distributing system, the combination of a reservoir for grease having an outlet pipe, means for ejecting said grease under pressure from said outlet, a distributing manifold connected to said outlet pipe, a plurality of measuring pumps each including a cylinder having an inlet passage connected to said manifold and an outlet passage, an inwardly opening check-valve in said inlet passage, an outwardly opening check-valve in said outlet passage, and a piston reciprocable in said cylinder whereby forcible movement of said piston in one direction ejects grease from said cylinder through said outlet passage and the pressure of the grease in said manifold causes the grease to flow into said cylinder and actuates said piston in the other direction.

2. In a grease distributing system, the combination of a reservoir for grease having an outlet pipe, means for ejecting said grease under pressure from said outlet, a distributing manifold connected to said outlet pipe, a plurality of measuring pumps each including a cylinder having an inlet passage connected to said manifold and an outlet passage, an inwardly opening check-valve in said inlet passage, an outwardly opening check-valve in said outlet passage, and a piston reciprocable in said cylinder, whereby forcible movement of said piston in one direction ejects grease from said cylinder through said outlet passage and the pressure of the grease in said manifold causes the grease to flow into said cylinder and actuates said piston in the other direction, a fluid pressure motor for actuating said pump piston in the direction to eject such grease from said cylinder including a motor piston directly connected to said pump piston, a motor cylinder in which said motor piston reciprocates, means for alternately supplying and venting fluid under pressure and from one side of said motor piston to eject grease from said pump and permit said cylinder to be filled by grease from said manifold respectively, an inverted U-shaped yoke having its arms pivotally connected to said cylinder with its base adapted to overlie said handle or be swung to one side thereof to permit manual operation of said pump by said handle, and an adjustable stop screw in said base to be engaged by said handle to limit movement of said pump piston in the other direction and vary the quantity of grease admitted to said pump cylinder.

3. In a grease distributing system, the combination of a reservoir for grease having an outlet pipe, means for ejecting said grease under pressure from said outlet, a distributing manifold connected to said outlet pipe, a plurality of measuring pumps each including a cylinder having an inlet passage connected to said manifold, and an outlet passage, an inwardly opening check-valve in said inlet passage, an outwardly opening check-valve in said outlet passage, and a piston reciprocable in said cylinder, whereby forcible movement of said piston in one direction ejects grease from said cylinder through said outlet passage and the pressure of the grease in said manifold causes the grease to flow into said cylinder and actuates said piston in the other direction, and a spring pressed piston in said manifold normally under compression by the pressure of the grease in said manifold to compensate for reductions in pressure in said manifold due to flow of grease therefrom into said cylinders faster than grease is supplied to the manifold by the first-mentioned means.

JOSEPH W. WOODRUFF.